(12) United States Patent
Kalyanaraman et al.

(10) Patent No.: US 10,377,863 B2
(45) Date of Patent: Aug. 13, 2019

(54) PROCESS OF MAKING POLYIMIDE MICRONIZED PARTICLES, PARTICLES FORMED THEREFROM, AND ARTICLES PREPARED THEREFROM

(71) Applicant: SABIC Global Technologies B.V., Bergen op Zoom (NL)

(72) Inventors: Viswanathan Kalyanaraman, Newburgh, IN (US); Hareesh Shamrao Deshpande, Bangalore (IN); Ekrem Mehmet Morali, Mt. Vernon, IN (US)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 9 days.

(21) Appl. No.: 15/737,649

(22) PCT Filed: Jun. 29, 2016

(86) PCT No.: PCT/US2016/039994
§ 371 (c)(1),
(2) Date: Dec. 18, 2017

(87) PCT Pub. No.: WO2017/004140
PCT Pub. Date: Jan. 5, 2017

(65) Prior Publication Data
US 2018/0155506 A1 Jun. 7, 2018

(30) Foreign Application Priority Data
Jun. 30, 2015 (IN) ............... 1949/DEL/2015

(51) Int. Cl.
*C08J 3/14* (2006.01)
*C08J 3/07* (2006.01)
*C09D 179/08* (2006.01)
*B01D 21/26* (2006.01)
*B01D 33/64* (2006.01)
*C08G 73/10* (2006.01)
*C09J 179/08* (2006.01)

(52) U.S. Cl.
CPC .............. *C08J 3/14* (2013.01); *B01D 21/262* (2013.01); *B01D 33/64* (2013.01); *C08G 73/106* (2013.01); *C08G 73/1053* (2013.01); *C08G 73/1064* (2013.01); *C08G 73/1071* (2013.01); *C08J 3/07* (2013.01); *C09D 179/08* (2013.01); *C09J 179/08* (2013.01); *C08J 2379/08* (2013.01)

(58) Field of Classification Search
USPC ......................................... 528/281, 282, 289
See application file for complete search history.

(56) References Cited

U.S. PATENT DOCUMENTS

| 4,404,350 A | 9/1983 | Ryang |
| 4,690,997 A | 9/1987 | Cella et al. |
| 4,808,686 A | 2/1989 | Cella et al. |
| 2002/0045725 A1 | 4/2002 | Vodermayer et al. |
| 2014/0272430 A1 | 9/2014 | Kalayaraman |

FOREIGN PATENT DOCUMENTS

| EP | 2392550 A1 | 12/2011 |
| FR | 2995312 A1 | 3/2014 |

OTHER PUBLICATIONS

International Search Report for International Application No. PCT/US2016/039994; Date of Completion: Sep. 22, 2016; dated Oct. 5, 2016; 6 Pages.
Written Opinion of the International Searching Authority; International Application No. PCT/US2016/039994; International Filing Date Jun. 29, 2016; 6 pages.

*Primary Examiner* — Terressa Boykin
(74) *Attorney, Agent, or Firm* — Cantor Colburn LLP (57) ABSTRACT

A method of manufacturing polyimide particles includes combining a polyimide solution including a polyimide and an organic solvent with an aqueous solution including water in the presence of an emulsifying surfactant at a shear rate from 1,000 to 3,000 revolutions per minute to form an emulsion. The method further includes removing the organic solvent to form an aqueous polymer dispersion including polyimide particles, and recovering the polyimide particles. The polyimide particles have a spherical morphology and a volume based D10 diameter from 3 to 50 micrometers, a volume based D90 diameter from 3 to 80 micrometers, and a volume based D100 diameter from 3 to 100 micrometers.

13 Claims, 2 Drawing Sheets

PROCESS OF MAKING POLYIMIDE MICRONIZED PARTICLES, PARTICLES FORMED THEREFROM, AND ARTICLES PREPARED THEREFROM

CROSS REFERENCE TO RELATED APPLICATIONS

This application is a 371 of International Application No. PCT/US2016/039994, filed Jun. 29, 2016, which claims the benefit if Indian Application No. 1949/DEL/2015, filed Jun. 30, 2015, both of which are incorporated by reference in their entirety herein.

BACKGROUND

Thermoplastic polymers such as polyimide (PI) are commonly used in thermoplastic composites, coatings, or thin films, for example. It is difficult to make small particles of polyimides with specified size parameters, and the methods used to make small particles of polyimides produce particles at low rates, making the methods less desirable for commercial production.

There accordingly still remains a continuing need for methods of making polyimide particles, the polyimide particles, and articles including the polyimide particles.

BRIEF DESCRIPTION

Disclosed herein are methods of manufacturing polyimide particles, polyimide particles made from such methods, and articles formed therefrom.

In particular, the inventors hereof have developed a method of manufacturing polyimide particles, including: combining a polyimide solution including a polyimide and an organic solvent with an aqueous solution including water in the presence of an emulsifying surfactant at a shear rate from 1,000 to 3,000 revolutions per minute, preferably from 1,000 to 2,500 revolutions per minute, preferably less than 2,500 revolutions per minute, more preferably from 1,500 to less than 2,500 revolutions per minute to form an emulsion; removing the organic solvent from the emulsion to form an aqueous polymer dispersion including polyimide particles; and recovering the polyimide particles from the aqueous polymer dispersion, wherein the polyimide particles have a spherical morphology, and a volume based D10 diameter from 3 to 50 micrometers, preferably from 3 to 45 micrometers and a volume based D90 diameter from 3 to 80 micrometers, preferably from 3 to 75 micrometers, more preferably from 3 to 45 micrometers and a volume based. D100 diameter from 3 to 100 micrometers, preferably from 3 to 75 micrometers, more preferably from 10 to 75 micrometers.

Another method of manufacturing polyimide particles includes: contacting a polyimide solution including a polyimide and an organic solvent with an aqueous solution including water in the presence of a surfactant at a shear rate from 1,000 to 3,000, preferably from 1,000 to 2,500 revolutions per minute to form an emulsion; transferring the emulsion into a receiving water at a temperature of 65° C. to 100° C. to remove the organic solvent and form an aqueous polymer dispersion, wherein the concentration of organic solvent in the aqueous polymer dispersion can be less than 75 ppm, preferably less than 50 ppm, more preferably less than 25 ppm; forming a wet cake and an aqueous phase from the aqueous polymer dispersion, wherein the conductivity of the aqueous phase can be less than 100 microsiemens, preferably less than 50 microsiemens, more preferably less than 15 microsiemens; drying the wet cake to recover polyimide particles; wherein the polyimide particles are recovered, through a centrifuge device at a rate of 5 to 40 kilograms/hour/meter squared (kg/hr/m$^2$), preferably 10 to 35 kg/hr/m$^2$, more preferably 15 to 35 kg/hr/m$^2$, or through a pressure filtration device at a rate of 215 to 1500 kg/hr/m$^2$, preferably 215 to 1300 kg/hr/m$^2$, preferably 290 to 1300 kg/hr/m$^2$, more preferably from 450 to 1300 kg/hr/m$^2$, and wherein the polyimide particles have a spherical morphology and a volume based D10 diameter from 3 to 50 micrometers, preferably from 3 to 45 micrometers and a volume based D90 diameter from 3 to 80 micrometers, preferably from 3 to 75 micrometers, more preferably from 3 to 45 micrometers and a volume based D100 diameter from 3 to 100 micrometers, preferably from 3 to 75 micrometers, more preferably from 10 to 75 micrometers is also described.

Polyimide particles made by the above methods are also described.

Polyimide or polyetherimide particles including a spherical morphology and a volume based D10 diameter from 3 to 50 micrometers, preferably from 3 to 45 micrometers and a volume based D90 diameter from 3 to 80 micrometers, preferably from 3 to 75 micrometers, more preferably from 3 to 45 micrometers and a surfactant concentration less than 100 ppm, preferably less than 50 ppm, more preferably less than 25 ppm are also described.

An article including the polyimide particles formed by an above method is also described.

The above described and other features are exemplified by the following figures and detailed, description.

BRIEF DESCRIPTION OF THE DRAWINGS

The following Figures are exemplary embodiments.

DETAILED DESCRIPTION

Described herein is a method of manufacturing polyimide particles having a spherical morphology and specified size parameters. The method can produce polyimide particles having a spherical morphology and specified size parameters at a higher rate than other processes. Although Applicant is not required to provide a description of any theory of the operation and the appended claims should not be limited by applicant statements regarding such theory, it is thought that the method produces polyimide particles with higher performance characteristics due to the specified size parameters, low concentration of surfactant, low concentration of organic solvent, or a combination comprising at least one of the foregoing.

More specifically, provided is a method of manufacturing polyimide particles, including: combining a polyimide solution including a polyimide and an organic solvent with an aqueous solution including water in the presence of an emulsifying surfactant at a shear rate from 1,000 to 3,000 revolutions per minute, preferably from 1,000 to 2,500 revolutions per minute, more preferably from 1,500 to less than 2,500 revolutions per minute to form an emulsion; removing the organic solvent from the emulsion to form an aqueous polymer dispersion including polyimide particles; and recovering the polyimide particles from the aqueous polymer dispersion, wherein the polyimide particles have a spherical morphology, and a volume based D10 diameter from 3 to 50 micrometers, preferably from 3 to 45 micrometers and a volume based D90 diameter from 3 to 80 micrometers, preferably from 3 to 75 micrometers, more preferably from 3 to 45 micrometers and a volume based D100 diameter from 3 to 100 micrometers, preferably from 3 to 75 micrometers, more preferably from 10 to 75 micrometers. In some embodiments, the bulk density of the dry particles is greater than or equal to 0.5 grams/centimeter cubed (g/cm$^3$), preferably greater than or equal to 0.6 g/cm$^3$.

Removing the organic solvent can include heating the emulsion to a temperature effective to vaporize the organic solvent, preferably by heating the emulsion to a temperature of 70° C. to 100° C. Removing the organic solvent can include transferring the emulsion into a receiving water to remove the organic solvent. Removing the organic solvent can include combining the emulsion with water under conditions effective to form the aqueous polymer dispersion, preferably by contacting the emulsion with a receiving water. Contacting the emulsion with a receiving water can include transferring the emulsion into a receiving water. The receiving water can be at a temperature of 65° C. to 100° C., or up to the boiling point of water. The method can include forming drops including the emulsion before contacting the emulsion with the receiving water. Removing the organic solvent does not necessarily mean the amount of solvent remaining after removing is zero, or not detectable. Removing means the concentration of organic solvent is less after a removing process is performed than before a removing process is performed.

Recovering the polyimide particles from the aqueous polymer dispersion includes forming a wet cake including the polyimide particles and an aqueous phase, preferably wherein the aqueous phase has a conductivity from 0.01 to 100 microsiemens (μs), preferably from 0.10 to 50 μs, more preferably from 0.01 to 15 μs. As described further below, the conductivity of the aqueous phase is directly related to the concentration of surfactant, and measuring the conductivity provides a convenient way to determine the concentration of surfactant in a sample. Recovering includes filtering, preferably under pressure, to form the wet cake and the aqueous phase. Recovering includes centrifuging the aqueous dispersion to form the wet cake and the aqueous phase. Recovering includes washing the wet cake with an aqueous wash to provide a second aqueous phase, preferably until the conductivity of the second aqueous phase is from 0.01 to 100 μs, preferably from 0.10 to 50 μs, more preferably from 0.01 to 15 μs. Washing includes filtering an aqueous wash through the wet cake. Washing includes contacting the wet cake with an aqueous wash to form a slurry, and recovering the polyimide particles from the slurry.

Although Applicant is not required to provide a description of any theory of the operation and the appended claims should not be limited by applicant statements regarding such theory, it is thought that the shear rate for combining the polyimide solution and the aqueous solution is important in reducing the number of small particles formed. These small particles have a volume based D90 diameter of less than 3 micrometers, have a volume based D90 diameter of less than 2 micrometers, have a volume based D90 diameter of less than 1 micrometers, or a combination comprising at least one of the foregoing. A shear rate of less than or equal to 3,000 revolutions per minute, preferably less than or equal to 2,500 revolutions per minute, preferably from 1,000 to 2,500 revolutions per minute, more preferably from 1,500 to less than 2,500 revolutions per minute can be used to reduce the number of small particles formed.

The polyimide particles formed by a method described are recovered through a centrifuge device at a rate of 5 to 401 g/hr/m$^2$, preferably 10 to 35 kg/hr/m$^2$, more preferably 15 to 35 kg/hr/m$^2$ or through a pressure filtration device at a rate of 215 to 1500 kg/hr/m$^2$, preferably 215 to 1300 kg/hr/m$^2$, preferably 290 to 1300 kg/hr/m$^2$, more preferably from 450 to 1300 kg/hr/m$^2$.

The organic solvent can be an aprotic solvent, preferably a water-immiscible solvent with a boiling point below 100° C., preferably methylene chloride, chloroform, or a combination comprising at least one of the foregoing. Other water-immiscible solvents, such as ortho-dichlorobenzene, can be used and the solvent can be removed by distillation or azeotropic distillation. Where a coalescing agent such as dimethyl sulfoxide, dimethylformamide, or sulfolane is present, it can also be removed by distillation or azeotropic distillation. The concentration of organic solvent in the aqueous polymer dispersion can be less than 75 parts per million (ppm), preferably less than 50 ppm, more preferably less than 25 ppm. The polyimide particles comprise less than 100 ppm, preferably less than 50 ppm, more preferably less than 25 ppm of surfactant.

The concentration of the polyimide in the polyimide solution can be from 0.5 to 35 weight percent (wt %), preferably from 1 to 25 wt %, more preferably from 10 to 20 wt %. The ratio of aqueous solution to polyimide solution in the emulsion can be from 3:1 to 0.5:1 (wt %:wt %). The aqueous polymer dispersion includes from 0.01 to 5 wt %, preferably from 0.01 to 2 wt %, preferably less than 1 wt %, more preferably from 0.01 to 1 wt %, more preferably from 0.01 to less than 1 wt % of the emulsifying surfactant, wherein the wt % is based on the total weight of the aqueous polymer dispersion. The emulsifying surfactant can be an anionic, cationic, or non-ionic surfactant, or a combination comprising at least one of the foregoing, preferably an anionic surfactant. The surfactant can be sodium dodecyl benzene sulfonate, sodium lauryl sulfate, or a combination comprising at least one of the foregoing. "Emulsifying surfactant" is a type of "surfactant" and the use of a surfactant as an emulsifying surfactant or surfactant for each purpose or another purpose in the method will be clear from the context.

Anti-foaming agents can be added to the receiving water to minimize the foam during addition of the emulsion. Anti-foaming agents can be added in an amount from 0.01 wt % to 5 wt %, wherein the wt % is based on the total weight of the emulsion. Anti-foaming agents can be oil-based, silicone based, such as Dow Corning 1520, glycol based, alcohol based or other have other characteristics. Selection of the amount and type of anti-foaming agent can be based on process parameters and other considerations.

The polyimide can be a polyetherimide, preferably a polyetherimide comprising units derived from the reaction of bisphenol A dianhydride and m-phenylene diamine. The polyimide can be a polyetherimide homopolymer, a polyetherimide co-polymer such as, a poly(etherimide-siloxane), a (poly(etherimide sulfone)), or a combination comprising at least one of the foregoing. Polyimides comprising units derived from the reaction of any dianhydride and any diamine can be used if they are soluble in the organic solvent used.

Polyimides comprise more than 1, for example 10 to 1000, or 10 to 500, structural units of formula (1)

(1)

wherein each V is the same or different, and is a substituted or unsubstituted tetravalent $C_{4-40}$ hydrocarbon group, for example a substituted or unsubstituted $C_{6-20}$ aromatic hydrocarbon group, a substituted or unsubstituted, straight or branched chain, saturated or unsaturated aliphatic group, or a substituted or unsubstituted $C_{4-8}$ cycloalkylene group or a halogenated derivative thereof, in particular a substituted or unsubstituted $C_{6-20}$ aromatic hydrocarbon group. Exemplary aromatic hydrocarbon groups include any of those of the formulas wherein W is —O—, —S—, —C(O)—, —SO$_2$—, —SO—, —C$_y$H$_{2y}$— wherein y is an integer from 1 to 5 or a halogenated derivative thereof (which includes perfluoroalkylene groups), or a group of the formula T as described in formula (3) below.

Each R in formula (1) is the same or different, and is a substituted or unsubstituted divalent organic group, such as $C_{6-20}$ aromatic hydrocarbon group or a halogenated derivative thereof, a straight or branched chain $C_{2-20}$ alkylene group or a halogenated derivative thereof, a $C_{3-8}$ cycloalkylene group or halogenated derivative thereof, in particular a divalent group of formulas (2)

(2)

wherein Q$^1$ is —O—, —S—, —C(O)—, —SO$_2$—, —SO—, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In an embodiment R is m-phenylene, p-phenylene, or a diaryl sulfone.

Polyetherimides are a class of polyimides that comprise more than 1, for example 10 to 1000, or 10 to 500, structural units of formula (3)

(3)

wherein each R is the same or different, and is as described in formula (1).

Further in formula (3), T is —O— or a group of the formula —O—Z—O— wherein the divalent bonds of the —O— or the —O—Z—O— group are in the 3,3', 3,4', 4,3', or the 4,4' positions. The group Z in —O—Z—O— of formula is also a substituted or unsubstituted divalent organic group, and can be an aromatic $C_{6-24}$ monocyclic or polycyclic moiety optionally substituted with 1 to 6 $C_{1-8}$ alkyl groups, 1 to 8 halogen atoms, or a combination thereof, provided that the valence of Z is not exceeded. Exemplary groups Z include groups derived from a dihydroxy compound of formula (4)

(4)

wherein $R^a$ and $R^b$ can be the same or different and are a halogen atom or a monovalent $C_{1-6}$ alkyl group, for example; p and q are each independently integers of 0 to 4; c is 0 to 4; and $X^a$ is a bridging group connecting the hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula (4a)

(4a)

wherein Q is —O—, —S—, —C(O)—, —SO$_2$—, —SO— or —C$_y$H$_{2y}$— wherein y is an integer from 1 to 5 or a halogenated derivative thereof (including a perfluoroalkylene group). In a specific embodiment Z is a derived from bisphenol A, such that Q in formula (4a) is 2,2-isopropylidene.

In an embodiment in formula (3), R is m-phenylene or p-phenylene and T is —O—Z—O— wherein Z is a divalent group of formula (4a). Alternatively, R is m-phenylene or p-phenylene and T is —O—Z—O wherein Z is a divalent group of formula (4a) and Q is 2,2-isopropylidene.

In some embodiments, the polyetherimide can be a copolymer, for example, a poly(etherimide sulfone) copolymer comprising structural units of formula (1) wherein at least 50 mole % of the R groups are of formula (2) wherein is —SO$_2$— and the remaining R groups are independently p-phenylene or m-phenylene or a combination comprising at least one of the foregoing; and Z is 2,2'-(4-phenylene) isopropylidene.

Alternatively, the polyetherimide copolymer optionally comprises additional structural imide units, for example imide units of formula (1) wherein R is as described in formula (1) and V is a linker of the formulas

These additional structural imide units can be present in amounts from 0 to 10 mole % of the total number of units, specifically 0 to 5 mole %, more specifically 0 to 2 mole %. In an embodiment no additional imide units are present in the polyetherimide.

The polyimide and polyetherimide can be prepared by any of the methods well known to those skilled in the art, including the reaction of an aromatic bis(ether anhydride) of formula (5a) or formula (5b)

(5a)

(5b)

or a chemical equivalent thereof, with an organic diamine of formula (6)

H$_2$N—R—NH$_2$ (6)

wherein V, T, and R are defined as described above. Copolymers of the polyetherimides can be manufactured using a combination of an aromatic bis(ether anhydride) of formula (5) and a different bis(anhydride), for example a bis(anhydride) wherein T does not contain an ether functionality, for example T is a sulfone.

Illustrative examples of bis(anhydride)s include 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride; and, 4-(2,3-dicarboxyphenoxy)-4'-(3,4-dicarboxyphenoxy)diphenyl sulfone dianhydride, as well as various combinations thereof.

Examples of organic diamines include ethylenediamine, propylenediamine, trimethylenediamine, diethylenetriamine, triethylene tetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminoproproxy) ethane, bis(3-aminopropyl) sulfide, 1,4-cyclohexanediamine, bis-(4-aminocyclohexyl) methane, in-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2- chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, bis-(4-aminophenyl) sulfone, and bis(4-aminophenyl) ether. Combinations of these compounds can also be used. In some embodiments the organic diamine is m-phenylenediamine, p-phenylenediamine, sulfonyl dianiline, or a combination comprising at least one of the foregoing.

The thermoplastic composition can also comprise a poly(etherimide-siloxane) copolymer comprising polyetherimide units of formula (1) and siloxane blocks of formula (7)

(7)

wherein E has an average value of 2 to 100, 2 to 31, 5 to 75, 5 to 60, 5 to 15, or 15 to 40, and each R' is independently a $C_{1-13}$ monovalent hydrocarbyl group. For example, each R' can independently be a $C_{1-13}$ alkyl group, $C_{1-3}$ alkoxy group. $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination comprising at least one of the foregoing. In an embodiment no bromine or chlorine is present, and in another embodiment no halogens are present. Combinations of the foregoing R groups can be used in the same copolymer. In an embodiment, the polysiloxane blocks comprises R' groups that have minimal hydrocarbon content. In a specific embodiment, an R' group with a minimal hydrocarbon content is a methyl group.

The poly(etherimide-siloxane)s can be formed by polymerization of an aromatic bisanhydride (5) and a diamine component comprising an organic diamine (6) as described above or mixture of diamines, and a polysiloxane diamine of formula (8)

(8)

wherein R' and E are as described in formula (7), and $R^4$ is each independently a $C_2$-$C_{20}$ hydrocarbon, in particular a $C_2$-$C_{20}$ arylene, alkylene, or arylenealkylene group. In an embodiment $R^4$ is a $C_2$-$C_{20}$ alkylene group, specifically a $C_2$-$C_{10}$ alkylene group such as propylene, and E has an average value of 5 to 100, 5 to 75, 5 to 60, 5 to 15, or 15 to 40. Procedures for making the polysiloxane diamines of formula (8) are well known in the art.

In some poly(etherimide-siloxane)s, the diamine component can contain 10 to 90 mole percent (mol %), or 20 to 50 mol %, or 25 to 40 mol % of polysiloxane diamine (8) and 10 to 90 mol %, or 50 to 80 mol %, or 60 to 75 mol % of diamine (6), for example as described in U.S. Pat. No. 4,404,350. The diamine components can be physically mixed prior to reaction with the bisanhydride(s), thus forming a substantially random copolymer. Alternatively, block or alternating copolymers can be formed by selective reaction of (6) and (8) with aromatic bis(ether anhydrides) (5), to make polyimide blocks that are subsequently reacted together. Thus, the poly(siloxane-imide) copolymer can be a block, random, or graft copolymer. In an embodiment the copolymer is a block copolymer.

Examples of specific poly(etherimide-siloxane)s are described in U.S. Pat. Nos. 4,404,350, 4,808,686, and 4,690, 997. In an embodiment, the poly(etherimide-siloxane) has units of formula (9)

(9)

wherein R' and E of the siloxane are as in formula (7), the R and Z of the imide are as in formula (1), $R^4$ is the same as $R^4$ as in formula (8), and n is an integer from 5 to 100. In a specific embodiment, the R of the etherimide is a phenylene, Z is a residue of bisphenol A, $R^4$ is n-propylene, E is 2 to 50, 5, to 30, or 10 to 40, n is 5 to 100, and each R' of the siloxane is methyl.

The relative amount of polysiloxane units and etherimide units in the poly(etherimide-siloxane) depends on the desired properties, and are selected using the guidelines provided herein. In particular, as mentioned above, the block or graft poly(etherimide-siloxane) copolymer is selected to have a certain average value of E, and is selected and used in amount effective to provide the desired wt % of polysiloxane units in the composition. In an embodiment the poly(etherimide-siloxane) comprises 10 to 50 wt %, 10 to 40 wt %, or 20 to 35 wt % polysiloxane units, based on the total weight of the poly(etherimide-siloxane.

In some embodiments the polyimide can be a polyetherimide, preferably a polyetherimide comprising units derived from the reaction of bisphenol A dianhydride and m-phenylene diamine. The polyimide can be a polyetherimide homopolymer, a polyetherimide co-polymer, a poly(etherimide-siloxane), a poly(etherimide sulfone), or a combination comprising at least one of the foregoing.

The polyimides, specifically the polyetherimides, can have a melt index of 0.1 to 10 grams per minute (g/min), as measured by American Society for Testing Materials (ASTM) D1238 at 340 to 370° C., using a 6.7 kilogram (kg) weight. In some embodiments, the polyetherimide polymer has a weight average molecular weight (Mw) of 1,000 to 150,000 grams/mole (Dalton), as measured by gel permeation chromatography, using polystyrene standards. In some embodiments the polyetherimide has an Mw of 10,000 to 80,000 Daltons. Such polyetherimide polymers typically have an intrinsic viscosity greater than 0.2 deciliters per gram (dl/g), or, more specifically, 0.35 to 0.7 dl/g as measured in m-cresol at 25° C.

The aqueous polymer dispersion can include an additive composition including additives known for use in the intended application, provided that the additive or combination of additives does not substantially adversely affect the desired properties of the composite. The additive composition can include a stabilizer, a colorant, a filler, a polymer latex, a coalescing agent, a cosolvent, an adhesion promoter (e.g., a silane or titanate), or a combination comprising at least one of the foregoing. Each additive can be present in an amount of 0.1 to 10 wt %, wherein the wt % is based on the total weight of the aqueous polymer dispersion. The additive can be a coalescing agent. Some examples of coalescing agents are glycol ethers, N-methyl pyrrolidone, N,N-dimethylformamide, dimethyl sulfoxide, and sulfolane, which can be present in an amount of 0.1 to 10 wt %, based on the total weight of the aqueous polymer dispersion.

More specifically, a method of manufacturing polyimide particles, including contacting a polyimide solution including a polyimide and an organic solvent with an aqueous solution including water in the presence of a surfactant at a shear rate from 1,000 to 3,000, preferably from 1,000 to 2,500 revolutions per minute to form an emulsion; transferring the emulsion into a receiving water at a temperature of 65° C. to 100° C. to remove the organic solvent and form an aqueous polymer dispersion, wherein the concentration of organic solvent in the aqueous polymer dispersion can be less than 75 ppm, preferably less than 50 ppm, more preferably less than 25 ppm; forming a wet cake and an aqueous phase from the aqueous polymer dispersion, wherein the conductivity of the aqueous phase can be less than 100 μs, preferably less than 50 μs, more preferably less than 15 μs; drying the wet cake to recover polyimide particles; wherein the polyimide particles are recovered through a centrifuge device at a rate of 5 to 40 kg/hr/m$^2$, preferably 10 to 35 kg/hr/m$^2$, more preferably 15 to 35 kg/hr/m$^2$, or through a pressure filtration device at a rate of 215 to 1500 kg/hr/m$^2$, preferably 215 to 1300 kg/hr/m$^2$, preferably 290 to 1300 kg/hr/m$^2$, more preferably from 450 to 1300 kg/hr/m$^2$, and wherein the polyimide particles have a spherical morphology and a volume based D10 diameter from 3 to 50 micrometers, preferably from 3 to 45 micrometers and a volume based D90 diameter from 3 to 80 micrometers, preferably from 3 to 75 micrometers, more preferably from 3 to 45 micrometers and a volume based D100 diameter from 3 to 100 micrometers, preferably from 3 to 75 micrometers, more preferably from 10 to 75 micrometers is provided.

Polyimide particles or polyetherimide particles as described herein, including those formed by the methods described herein are provided. Polyimide or polyetherimide particles include a spherical morphology and a volume based D10 diameter from 3 to 50 micrometers, preferably from 3 to 45 micrometers and a volume based D90 diameter from 3 to 80 micrometers, preferably from 3 to 75 micrometers, more preferably from 3 to 45 micrometers and a surfactant concentration less than 100 ppm, preferably less than 50 ppm, more preferably less than 25 ppm.

An article includes the polyimide particles formed as described above, including those formed by the methods described herein. A large variety of articles can be manufactured, for example a cookware coating tie layer, an epoxy toughening coating, a composite, an adhesive, a tie layer to bond metal and a fluoropolymer, or a coating. In some embodiments the polyimide particles form a coating disposed on an injection molded article, an extruded article, an electrical conductor, an optical article, a wood article, a glass article, a carbon article, a plastic article, or a fiber, for example a ceramic fiber, a carbon fiber, a glass fiber, a boron fiber, a silicon fiber, an aluminum fiber, a zirconium fiber, or a combination comprising at least one of the foregoing fibers. In some embodiments the particles are used to form prepregs for use in the manufacture of composites. The prepregs can include continuous unidirectional fiber-reinforced tapes that can be used in the manufacture of laminates, in particular tapes comprising carbon fibers.

The methods, compositions, and articles are further illustrated by the following non-limiting examples.

EXAMPLES

The materials in Table 1 were used.

TABLE 1

| Component | Description (trade name) | Supplier |
|---|---|---|
| PEI | Polyetherimide derived from bisphenol A dianhydride and m- phenylene diamine, using either aniline or phthalic anhydride as end cap (ULTEM 1000) | SABIC |
| DCM | Methylene chloride (dichloromethane) solvent | Fisher Scientific |
| SDBS surfactant | Sodium dodecyl benzene sulfonate | Pilot |

A. General Procedure

A thermoplastic polymer such as polyetherimide from SABIC (ULTEM 1000) can be dissolved in an organic solvent such as methylene chloride to provide a homogeneous polymer solution without any visible suspended particles. Deionized water and surfactant can be added to the polymer solution. Anionic, cationic, or non-ionic surfactants can be used as surfactants. Emulsification can be carried out with high shear agitation, for example, which results in a stable emulsion. The emulsion can be slowly transferred to another vessel containing deionized water ("receiving water") maintained at a temperature greater than 70° C. The disengaged organic solvent can be captured via a cold water circulated condenser or other useful method. The receiving water can optionally contain surfactant. The addition of the emulsion into the receiving water can be drop-wise or through a nozzle which can produce fine droplets, for example. The vessel containing the emulsion can be pressurized and heated, if needed. Pressure and heat can help transfer the emulsion to the next reactor. Pressure and heat can also aid in the dis-engagement of solvent when it is sprayed into a reactor at atmospheric pressure. In some examples, the emulsion is heated to 50° C. with a 50 pounds per square inch (PSI) pressure build up. Optionally, anti-foaming agents can be added to the receiving water to minimize the foam during addition of the emulsion. The organic solvent can be removed from the receiving water until the organic solvent content is at the desired level, for example, less than 50 ppm, measured by Gas Chromatography. Removing the organic solvent results in an aqueous polymer dispersion (also referred to as aqueous polymer slurry or slurry in these examples).

The aqueous polymer slurry can be maintained under mild agitation at a temperature greater than 70° C., so that a minimal amount of microbubbles are formed in the reactor. The aqueous polymer slurry can be transferred to the filtration/isolation device using gravity, for example. In the examples below, the following isolation methods were used: (a) centrifuge isolation and (b) pressure filtration. Filtration media that filters particles greater than 10 micrometers and greater than 20 micrometers can be used for filtration, followed by washing with deionized water until the conductivity of the filtrate is at a desired level, for example, less than or equal to 15 μs. The wet cake can be dried, for example, at a temperature above 100° C., under nitrogen atmosphere, for example, until the moisture content of the particles is at a desired level, for example, less than 1%. The resulting dry polymer particles can be evaluated for residual surfactant content by high performance liquid chromatography (HPLC) or inductively coupled plasma (ICP), for example.

The concentration of SDBS and the conductivity of the aqueous polymer solution has a linear correlation ($R^2$=0.9831) as seen in Table 2.

TABLE 2

| SDBS concentration, ppm | Conductivity, μs |
|---|---|
| 0 | 7.67 |
| 10.14 | 11.4 |
| 25.35 | 15.41 |
| 50.7 | 19.27 |
| 101.4 | 36.99 |

Pressure Filtration:

A pressure filtration device was used in some examples. The pressure filtration device used in these examples was from Mott Corporation. A 20 micrometer sintered metal filtration media was chosen. An example pressure filtration process involved the following steps: The aqueous polymer slurry was heated to 80° C.; the slurry was filtered via Mott pressure filter using 50 PSI pressure; deionized water at 80° C. was added to the wet cake and filtered. The above process was repeated until the conductivity of the filtrate reached less than 15 μs. The total filtration time (in seconds) was calculated by adding all the individual filtration times.

A rotary pressure filtration device (RPF) was used in some examples. The RPF has total surface area of 0.168 m² with 16 zones. 4 out of 16 zones were dedicated to filtration and the rest were used for washing, drying, and zone separation. The equipment can be run under pressure up to 6 bars. The equipment consists of multiple cells (similar to individual pocket leaf/Mott filters) that rotate in a clock-wise direction. In operation, the slurry enters the RPF from the bottom and it is distributed in the filtration zone to fill the individual cells (filtration). As the filled cells move from the filtration zone into the washing section, high pressure water is passed through the filter cake to remove surfactant. Finally, the cells move through a drying section where excess water is displaced with dry nitrogen. The cell depth in the equipment can be adjusted ensuring a pre-set cake thickness. For the experiments described here, the cell depth was set for 11 millimeters. For the experiments described here, a constant slurry feed pressure of 72 PSI (5 bar) and slurry temperature of 75° C. were used.

Centrifuge Filtration:

A centrifugal filtering device was used in some examples. Generally, a gravitational force (G-force) is exerted on a sample, which provides liquid-solid separation. A centrifuge was used that has the dimensions of: 24 inch internal diameter and 13.77 inch length, giving a surface area of: 0.67 meters squared (m²).

B. Making Aqueous Polymer Slurry Batches

Two aqueous polymer slurry batches were made using the following procedure:

Batch 1: 1485 pounds of polyetherimide (ULTEM 1000) was dissolved in 5933 pounds of dichloromethane in a 1500 gallon reactor. Dissolution was accelerated by agitation as well as maintaining the temperature of the reactor around 30° C. The percentage of solids in the polymer solution was checked at regular intervals and found to reach 20±1% at 3 hours. The reactor was cooled to room temperature (23° C.) and 6026 pounds of deionized water and 32 pounds of 40 wt % sodium dodecyl benzene sulfonate (SDBS) surfactant were added to the reactor. The reactor contents were agitated to form a pre-emulsion mixture. From the bottom of the reactor, the contents were emulsified using a Silverson (450 L) homogenizer at 3600 revolutions per minute (RPM) and brought back to the top of the reactor. Every hour, a sample was collected from the bottom of the reactor (before entering the homogenizer). 2 grams of the emulsion sample was transferred drop-wise into 50 grams of deionized water at 90° C. After 15 minutes at 90° C., the aqueous slurry was cooled down to room temperature and the particle size distribution (volume based) was evaluated using a Malvern 3000 particle size analyzer. Emulsification was continued in the reactor with Silverson homogenizer until the D90 (volume based particle diameter) of the aqueous slurry based on emulsion sample was less than 45 micrometers. The emulsion prepared above was heated to 50° C. under 50 pounds per square inch pressure and slowly transferred to another 3000 gallon vessel containing 4128 pounds of deionized water, 22 pounds of 40 wt % sodium dodecyl benzene sulfonate surfactant, and 1.5 pounds of Dow Corning 1520, which was maintained at greater than 70° C. After the entire emulsion was transferred to the receiving water, the receiving water was maintained at greater than 70° C. until the residual organic solvent of aqueous polymer slurry was less than 50 parts per million (ppm). This resulted in an aqueous polymer slurry with solids content of 16.5% and conductivity greater than 500 μs.

Batch 2: Aqueous polymer slurry was formed using the procedure as given for Batch 1 except changing the homogenization speed to 2100 RPM. The resulting aqueous polymer slurry had a solids content of 12.5% and conductivity greater than 500 μs.

Properties of Batch 1 were: 3600 RPM used to form emulsion; 4 hours of emulsification; final conductivity of slurry greater than 500 μs; 16.5% solids.

Properties of Batch 2 were: 2100 RPM used to form emulsion; 7 hours of emulsification; conductivity of slurry greater than 500 μs; 12.5% solids.

Figure 1:
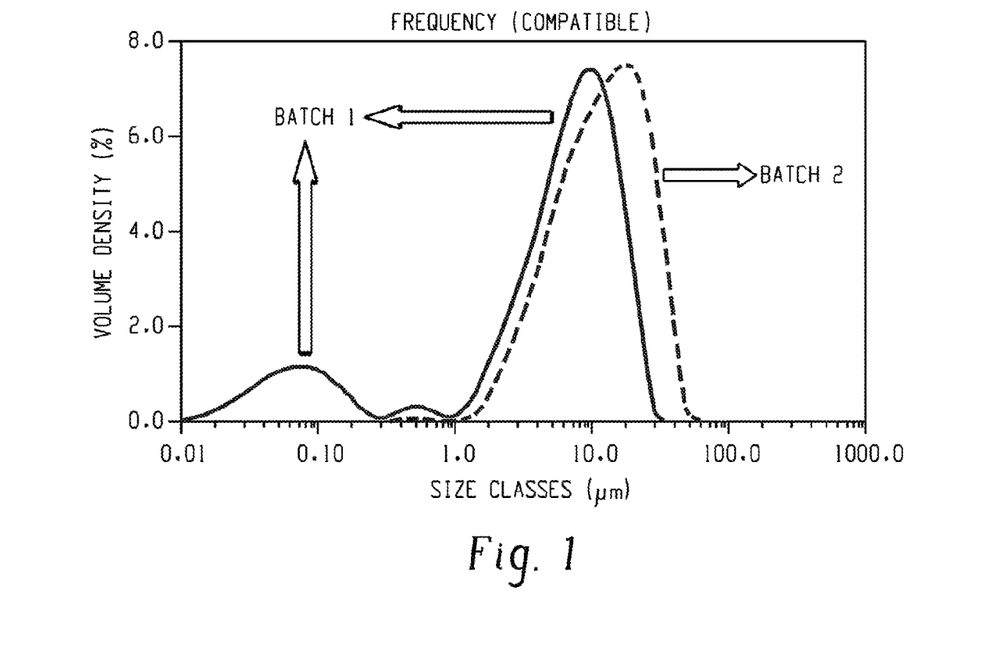
FIG. 1 shows size distribution of particles from Batch 1 and Batch 2.

Table 3 and FIG. 1 shows the particle size analysis of Batch 1 and Batch 2 via light scattering measurements. D100, D90, D50, and D10 correspond to volume based diameters in micrometers (μm).

TABLE 3

| | D10 | D50 | D90 | D100 | Mode |
|---|---|---|---|---|---|
| Batch 2 | 3.91 μm | 12.1 μm | 28.3 μm | 45.6 μm | 17.6 μm |
| Batch 1 | 0.0977 μm | 6.70 μm | 16.2 μm | 27.4 μm | 9.76 μm |

Figure 2:
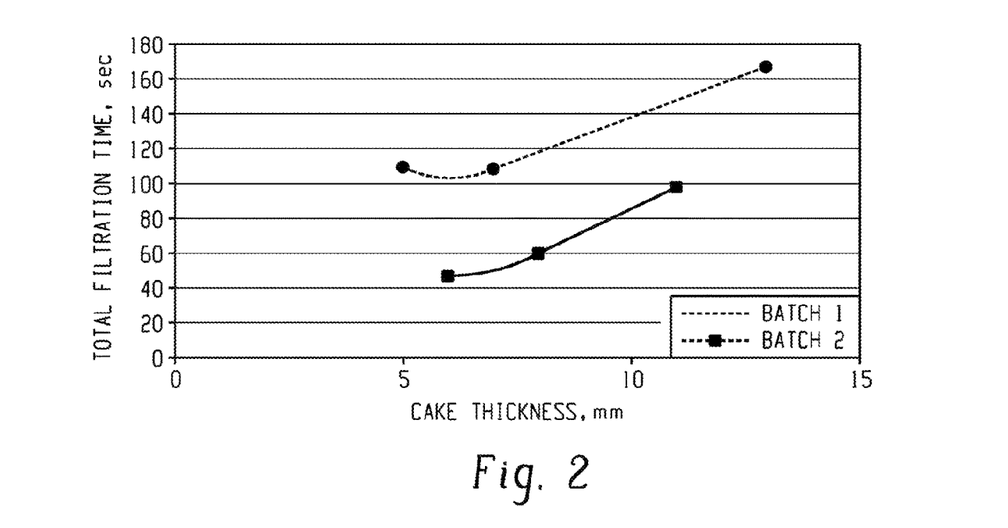
FIG. 2 shows wet cake thickness in millimeters (mm) and total filtration time in seconds (sec) to reach a conductivity below 15 microsiemens for Batch 1 and Batch 2.

Filtration times for aqueous polymer slurry from Batch 1 and Batch 2 were determined as follows. Table 4 shows the pressure filtration of aqueous polymer slurry from Batch 1 and Batch 2 via the Mott pressure filter with 20 micrometer sintered metal media. The slurry from Batch 1 and Batch 2 were each added to the Mott filter at 80° C. and filtered using in-house nitrogen at 50 PSI pressure. Column 4 shows the filtration time in seconds (sec) and column 5 shows the conductivity of filtrate of the slurry in microsiemens (μs). To this wet cake, 25 grams of deionized water at 80° C. was added and filtered by applying 50 PSI pressure. The filtration time and conductivity of the filtrate are given in column 7 and 8. To this wet cake, 25 grams of deionized water at 80° C. was added and filtered by applying 50 PSI pressure. The filtration time and conductivity of the filtrate are given in column 9 and 10. The final thickness of the wet cake in millimeters (mm) and moisture content is given in column 11 and 12. The total filtration time to filter the slurry to achieve final conductivity of less than or equal to 15 μs is given in column 13. Results are shown in FIG. 2.

normalizes the filtration media dimensions. It can be clearly seen that irrespective of the cake thickness, Batch 2 always produces higher filtration rates as compared to Batch 1. Although Applicant is not required to provide a description of any theory of the operation and the appended claims should not be limited by applicant statements regarding such theory, it is thought that the slower filtration rates of Batch 1 is attributed to high ultra-fine particles (below 1 micrometer) in Batch 1.

Table 5 shows the results of pressure filtration of Batch 2 using a pressure filter device using a Mott filter with 20 micrometer sintered metal media. The row labeled Batch 2 as such, represents Batch 2 prepared as described above and shows the filtration results of aqueous polymer slurry from Batch 2 at 80° C. using 50 PSI pressure. After filtering the mother liquor, the wet cake was washed twice with 25 grams of deionized water at 80° C. using 50 PSI pressure. This process was repeated to obtain a large amount of wet cake of Batch 2. The wet cake was then dried in a vacuum oven at 140° C. One part of the dried particles were re-slurried

TABLE 4

| Sample Name | Dry slurry grams | Dry polymer, grams | slurry Filtration Filtration Time, sec | slurry Filtration Filtrate Conduct., μs | Filtration rate, kg dry particles/ hr/m² (only for the slurry Filtration) | Wash, 1 25 grams of water Filtration Time, sec | Wash, 1 25 grams of water Filtrate Conduct., μs | Wash, 2 25 grams of water Filtration Time, sec | Wash, 2 25 grams of water Filtrate Conduct., μs | Wet cake Thickness mm | Solids, % in the wet cake | Total filtration time, sec |
|---|---|---|---|---|---|---|---|---|---|---|---|---|
| Batch 1 | 50 | 8.25 | 60 | 584 | 136 | 28 | 67 | 21 | 12 | 5 | 87 | 109 |
| Batch 2 | 66 | 8.25 | 28 | 521 | 292 | 9 | 38 | 9 | 8 | 5 | 88.7 | 46 |
| Batch 1 | 75 | 12.375 | 58 | 548 | 212 | 27 | 64 | 22 | 14 | 8 | 83.5 | 107 |
| Batch 2 | 99 | 12.375 | 33 | 520 | 372 | 14 | 51 | 13 | 10 | 8 | 84.7 | 60 |
| Batch 1 | 100 | 16.5 | 83 | 592 | 197 | 43 | 136 | 40 | 18 | 11 | 86.5 | 166 |
| Batch 2 | 132 | 16.5 | 50 | 550 | 327 | 27 | 80 | 20 | 15 | 11 | 83 | 97 |

It can be seen from Table 4 and FIG. 1 that the aqueous polymer slurry based on Batch 2 can be filtered and washed to obtain a final conductivity of the wash phase of less than or equal to 15 s with a shorter cycle time compared to Batch 1, irrespective of the sample loading. This indicates that the small particle size nature of Batch 1 with a D10 less than 0.1 micrometers is not favorable for faster filtration. The filtration rate in kilograms of dry polymer per hour times meters squared (kg dry polymer/hr/m²) given in Table 4, column 6 with deionized water to obtain same original solids % of Batch 2. Filtration studies were carried out with this dispersion (slurry) as described above and results are shown in the second to last row. Another part of dried particles were re-slurried with deionized water as well as SDBS surfactant to provide same solids % and conductivity as in original Batch 2 slurry. Filtration studies were carried out with this slurry as described above and the results are shown in the last row.

TABLE 5

| Sample Name | Slurry grams | Dry polymer, grams | Slurry Filtration Filtration Time, sec | Slurry Filtration Filtrate Conduct., μs | Filtration rate, kg dry particles/ hr/m² (only for the slurry Filtration) | Wash, 1 25 grams of water Filtration Time, sec | Wash, 1 25 grams of water Filtrate Conduct., μs | Wash, 2 25 grams of water Filtration Time, sec | Wash, 2 25 grams of water Filtrate Conduct., μs | Wet cake Thickness, mm | Total filtration time, sec |
|---|---|---|---|---|---|---|---|---|---|---|---|
| Batch 2 as such | 132 | 16.5 | 50 | 550 | 327 | 27 | 80 | 20 | 15 | 11 | 97 |
| Batch 2 reslurried with water | 132 | 16.5 | 17 | 5 | 962 | 9 | 3 | 6 | 2 | 11 | 32 |

TABLE 5-continued

| Sample Name | Slurry grams | Dry polymer, grams | Slurry Filtration Filtration Time, sec | Slurry Filtration Filtrate Conduct., µs | Filtration rate, kg dry particles/hr/m² (only for the slurry Filtration) | Wash, 1 25 grams of water Filtration Time, sec | Wash, 1 25 grams of water Filtrate Conduct., µs | Wash, 2 25 grams of water Filtration Time, sec | Wash, 2 25 grams of water Filtrate Conduct., µs | Wet cake Thickness, mm | Total filtration time, sec |
|---|---|---|---|---|---|---|---|---|---|---|---|
| Batch 2 reslurried with water and surfactant | 132 | 16.5 | 48 | 504 | 341 | 20 | 99 | 19 | 14 | 11 | 87 |

It can be seen that when the surfactant is removed from the slurry, the filtration and washing time was reduced by 66% (Table 5, second to last row). It can be also seen from Table 5 that addition of surfactant to the aqueous polymer slurry increases the total filtration and washing time significantly (Table 5, last row). This shows that there is a correlation between surfactant concentration and total filtration as well as washing time.

To further evaluate the effect of surfactant concentration on filtration time, 2000 grams of the aqueous polymer slurry from Batch 2 was filtered using pressure filtration, washed thoroughly with water repeatedly to remove surfactant, and dried in a vacuum oven. To these dry polymer particles, 2216.6 grams of water was added and re-slurried to form an aqueous polymer slurry with 10.9% solids and about 2 µs conductivity. This slurry was filtered through the Mott filter with 20 micrometer sintered metal media at 80 deg C. with 50 PSI pressure. This was followed by two more successive washings with 25 grams of deionized water at 80 deg C. with 50 PSI pressure. The results are shown in Table 6. This filtration procedure was repeated, with gradual addition of the surfactant in the slurry and the filtration results are shown in Table 6 and FIG. 3.

weight percentage and conductivity were further adjusted. For these experiments, following an overnight long decantation, the top water layer was removed to increase the solids concentration. Later, deionized water and surfactant were added to adjust the solids weight percentage and slurry conductivity to the desired levels. The slurry was fed to the RPF at 5 bars (72 PSI) and 75° C.

TABLE 7

| Solids wt % | Slurry Conductivity, µs | Filtration rate for slurry, kg dry particles/hr-m² | D10, µm | Cake thickness, mm |
|---|---|---|---|---|
| 7.07 | 150 | 481 | 3.91 | 11 |
|  | 210 | 465 |  |  |
| 16.4 | 213 | 946 |  |  |
|  | 300 | 718 |  |  |
| 20.7 | 91 | 1257 |  |  |
|  | 150 | 1034 |  |  |

These experiments showed that for samples having the same solids percentage, increased conductivity resulted in decreased filtration rate. The experiments performed show the particle size distribution affects the total filtration time.

TABLE 6

| Slurry weight, grams | SDBS, grams | Slurry conduct., µs | Mother liquor Filtration time, sec | Mother liquor Filtrate conduct., µs | Filtration rate, kg dry particles/hr-m² (only for the slurry Filtration) | wash 1 with 25 grams of DI water Filtration time, sec | wash 1 with 25 grams of DI water Filtrate conduct., µs | wash 1 with 25 grams of DI water Filtration time, sec | wash 1 with 25 grams of DI water Filtrate conduct., µs | Cake Thickness (mm) | Total filtration time, sec |
|---|---|---|---|---|---|---|---|---|---|---|---|
| 151 | 0 | 4 | 33 | 8 | 494 | 8 | 4 | 7 | 3 | 11 | 48 |
| 151 | 0.01 | 29 | 41 | 29 | 398 | 10 | 9 | 7 | 5 | 11 | 58 |
| 151 | 0.02 | 35 | 42 | 35 | 389 | 10 | 8 | 7 | 5 | 11 | 57 |
| 151 | 0.05 | 70 | 47 | 73 | 347 | 18 | 21 | 11 | 4 | 11 | 76 |
| 151 | 0.1 | 91 | 49 | 98 | 333 | 15 | 24 | 13 | 6 | 11 | 77 |
| 151 | 0.2 | 160 | 55 | 168 | 297 | 20 | 30 | 15 | 8 | 11 | 90 |
| 151 | 0.67 | 420 | 75 | 430 | 218 | 18 | 50 | 15 | 12 | 11 | 105 |

Figure 3:
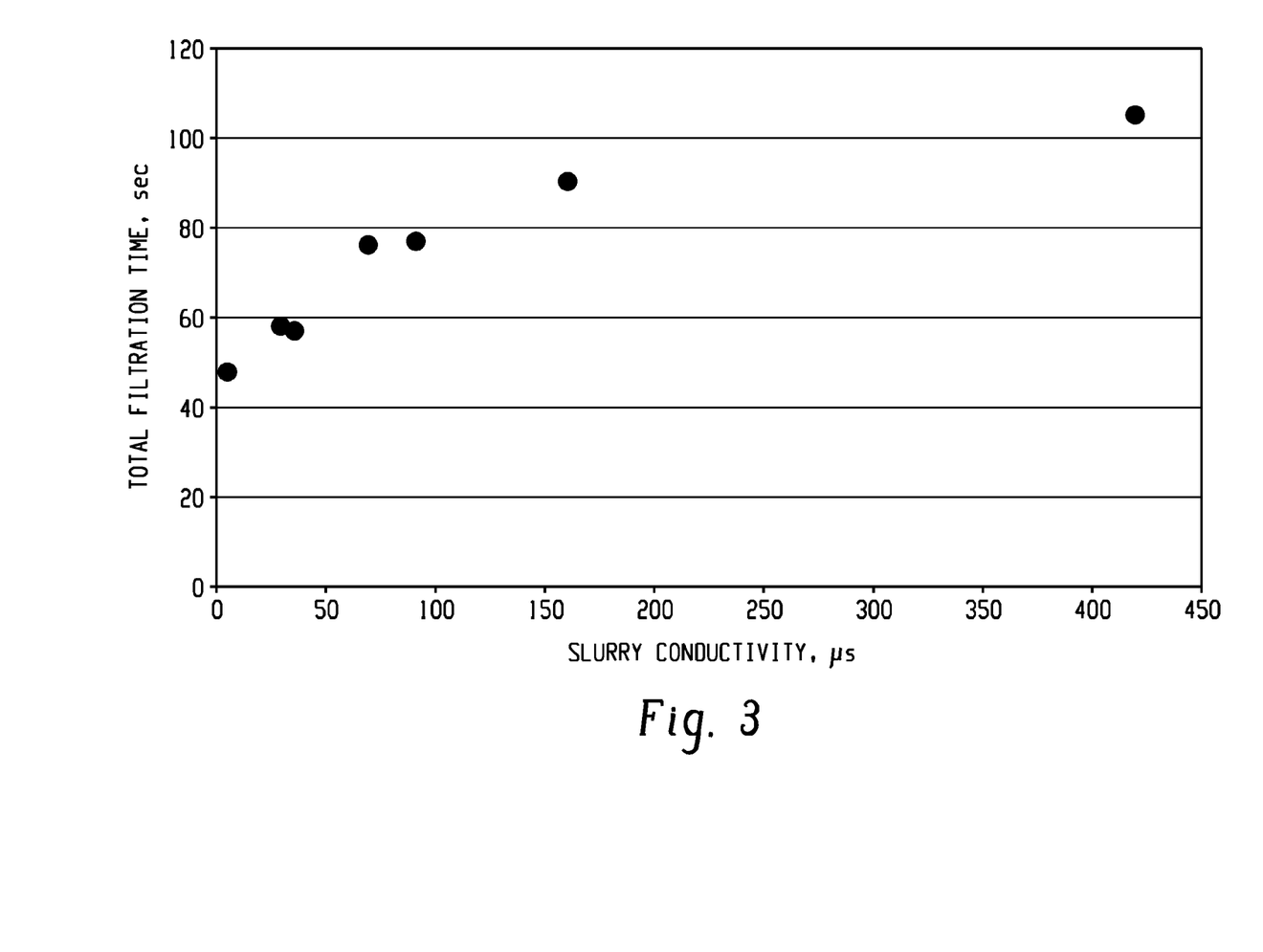
FIG. 3 shows the effect of the conductivity of the aqueous polymer slurry on the total filtration time to produce a wet cake with conductivity less than 15 microsiemens ($\mu$s).

It is clearly seen from Table 6 and FIG. 3 that total filtration time increases with increasing surfactant concentration. It can be seen from Table 6 that the filtration rate (kilogram dry polymer/hour-meter²) for filtering the mother liquor also goes down when the surfactant concentration increases.

Table 7 shows the filtration rates with the RPF. Batch 2 as characterized in the above section was used as the basis for the filtration study. In these experiments, the slurry solid The filtration rate is increased when the samples have fewer small particles, for example, below 3 micrometers. In addition, the surfactant concentration has a direct relationship with filtration times. It was seen that the higher the surfactant concentration is in the aqueous polymer solution, the longer the total filtration time required to produce a polymer particle wet cake.

Additional experiments were performed using centrifuge filtration.

Table 8 shows the effect of changing the temperature of the aqueous polymer slurry from ~35° C. to 70° C. Table 8 shows the different G-forces applied to the samples and the filtration rate. The Base Case is prepared using the same recipe and emulsification process conditions as Batch 1.

TABLE 8

| Case | G-Force | Filtration rate for slurry, kg dry Particles/hr-m² |
| --- | --- | --- |
| Base Case (~35° C.)) | 162.06 | 21 |
| Base Case @ 70° C. | 70.06 | 21 |
| Base Case @ 70° C. | 79.97 | 21 |
| Base Case @ 70° C. | 79.98 | 20 |
| Base Case @ 70° C. | 160.19 | 29 |
| Base Case @ 70° C. | 240.31 | 27 |
| Base Case @ 70° C. | 159.25 | 28 |

These experiments show that a temperature of the aqueous polymer slurry above room temperature provides faster filtration rates at a given G-force applied.

Table 9 shows the effect of the concentration of surfactant (SDBS) on the filtration rate. For the experiments described in Table 9, a SDBS concentration of 0.2% with respect to the concentration of water was used for the Base Case, and a 0.1% SDBS with respect to the weight of water was used for comparison (Reduced SDBS).

TABLE 9

| Case | G-Force | Filtration rate for slurry, kg dry particles/hr-m² |
| --- | --- | --- |
| Base Case @ 70° C. | 70.06 | 21 |
|  | 79.97 | 21 |
|  | 79.98 | 20 |
|  | 160.19 | 29 |
|  | 240.31 | 27 |
|  | 159.25 | 28 |
| Reduced SDBS (50% of SDBS used in Base Case) | 164.90 | 35 |
|  | 162.53 | 34 |
|  | 163.48 | 37 |

These experiments show that a reduced surfactant concentration results in faster filtration rates for a given G-force applied.

Table 10 shows the effect of G-force applied on the filtration rate.

TABLE 10

| Case | G-Force | Filtration rate for slurry, kg dry particles/hr-m² |
| --- | --- | --- |
| Base Case @ 70° C. | 70.06 | 21 |
|  | 79.97 | 21 |
|  | 79.98 | 20 |
|  | 160.19 | 29 |
|  | 240.31 | 27 |
|  | 159.25 | 28 |

These experiments show the G-force for these experiments has a maximum preferable amount to maximize the filtration rates.

Table 11 shows the effect of foam in the emulsion (referred to a feed slurry in Table 11) on the filtration rate.

TABLE 11

| Case | G-Force | Filtration rate for slurry, kg dry particles/hr-m² |
| --- | --- | --- |
| Base Case (Room Temp) | 162.06 | 21 |
| High Foam of Feed Slurry (Room Temp) | 82.30 | 5 |
|  | 79.64 | 7 |
| Base Case @ 70° C. | 70.06 | 21 |
|  | 79.97 | 21 |
|  | 79.98 | 20 |

These experiments show when there is a high amount of foam in the feed slurry, the filtration rate decreases.

The compositions, methods, articles and other aspects are further described by the Embodiments below.

Embodiment 1

A method of manufacturing polyimide particles, including: combining a polyimide solution including a polyimide and an organic solvent with an aqueous solution including water in the presence of an emulsifying surfactant at a shear rate from 1,000 to 3,000 revolutions per minute, preferably from 1,000 to 2,500 revolutions per minute, more preferably from 1,500 to less than 2,500 revolutions per minute to form an emulsion; removing the organic solvent from the emulsion to form an aqueous polymer dispersion including polyimide particles; and recovering the polyimide particles from the aqueous polymer dispersion, wherein the polyimide particles have a spherical morphology, and a volume based D10 diameter from 3 to 50 micrometers, preferably from 3 to 45 micrometers and a volume based D90 diameter from 3 to 80 micrometers, preferably from 3 to 75 micrometers, more preferably from 3 to 45 micrometers and a volume based D100 diameter from 3 to 100 micrometers, preferably from 3 to 75 micrometers, more preferably from 10 to 75 micrometers.

Embodiment 2

The method of Embodiment 1, wherein removing the organic solvent includes heating the emulsion to a temperature effective to vaporize the organic solvent, preferably by heating the emulsion to a temperature of 70° C. to 100° C.

Embodiment 3

The method of Embodiment 1, wherein removing includes combining the emulsion with water under conditions effective to form the aqueous polymer dispersion, preferably by contacting the emulsion with a receiving water.

Embodiment 4

The method of Embodiment 3, wherein the receiving water is at a temperature of 65° C. to 100° C.

Embodiment 5

The method of Embodiment 3 or 4, further including forming drops including the emulsion before contacting the emulsion with the receiving water.

Embodiment 6

The method of any one or more of Embodiments 1 to 5, wherein recovering includes forming a wet cake including the polyimide particles and an aqueous phase, preferably wherein the aqueous phase has a conductivity from 0.01 to 100 µs, preferably from 0.10 to 50 µs, more preferably from 0.01 to 15 µs.

Embodiment 7

The method of Embodiment 6, wherein recovering includes filtering, preferably under pressure, to form the wet cake and the aqueous phase.

Embodiment 8

The method of Embodiment 6, wherein recovering includes centrifuging the aqueous dispersion to form the wet cake and the aqueous phase.

Embodiment 9

The method of any one or more of Embodiments 6 to 8, wherein the recovering further includes washing the wet cake with an aqueous wash to provide a second aqueous phase, preferably until the conductivity of the second aqueous phase is from 0.01 to 100 µs, preferably from 0.10 to 50 µs, more preferably from 0.01 to 15 µs.

Embodiment 10

The method of Embodiment 9, wherein washing includes filtering the aqueous wash through the wet cake.

Embodiment 11

The method of Embodiment 9, wherein washing includes contacting the wet cake with the aqueous wash to form a slurry, and recovering the polyimide particles from the slurry.

Embodiment 12

The method of any one or more of Embodiments 1 to 11, wherein the polyimide particles are recovered through a centrifuge device at a rate of 5 to 40 kg/hr/m$^2$, preferably 10 to 35 kg/hr/m$^2$, more preferably 15 to 35 kg/hr/m$^2$, or through a pressure filtration device at a rate of 215 to 1500 kg/hr/m$^2$, preferably 215 to 1300 kg/hr/m$^2$, preferably 290 to 1300 kg/hr/m$^2$, more preferably from 450 to 1300 kg/hr/m$^2$.

Embodiment 13

The method of any one or more of Embodiments 1 to 12, wherein the concentration of the polyimide in the polyimide solution is from 0.5 to 35 weight percent, preferably from 1 to 25 weight percent, more preferably from 10 to 20 weight percent.

Embodiment 14

The method of any one or more of Embodiments 1 to 13, further including drying the recovered polyimide particles.

Embodiment 15

The method of any one or more of Embodiments 1 to 14, wherein the ratio of aqueous solution to polyimide solution in the emulsion is from 3:1 to 0.5:1.

Embodiment 16

The method of any one or more of Embodiments 1 to 15, wherein the organic solvent is an aprotic solvent, preferably methylene chloride, chloroform, or a combination comprising at least one of the foregoing.

Embodiment 17

The method of any one or more of Embodiments 1 to 16, wherein the organic solvent is methylene chloride.

Embodiment 18

The method of any one or more of Embodiments 1 to 17, wherein the aqueous polymer dispersion includes from 0.01 to 5 weight percent, preferably from 0.01 to 2 weight percent, more preferably from 0.01 to 1 weight percent of the emulsifying surfactant, wherein the weight percent is based on the total weight of the aqueous polymer dispersion.

Embodiment 19

The method of any one or more of Embodiments 1 to 18, wherein the emulsifying surfactant is an anionic, cationic, or non-ionic surfactant, or a combination comprising at least one of the foregoing, preferably an anionic surfactant.

Embodiment 20

The method of any one or more of Embodiments 1 to 19, wherein the emulsifying surfactant is sodium dodecyl benzene sulfonate, sodium lauryl sulfate, or a combination comprising at least one of the foregoing.

Embodiment 21

The method of any one or more of Embodiments 1 to 20, wherein the polyimide is a polyetherimide, preferably a polyetherimide including units derived from the reaction of bisphenol A dianhydride and m-phenylene diamine.

Embodiment 22

The method of any one or more of Embodiments 1 to 21, wherein the polyimide is a polyetherimide homopolymer, a polyetherimide co-polymer, for example a poly(etherimide-siloxane), a (poly(etherimide sulfone)), or a combination comprising at least one of the foregoing.

Embodiment 23

The method of any one or more of Embodiments 1 to 22, wherein the aqueous polymer dispersion further includes from 0.1 to 10 weight percent each of an additive, including a stabilizer, a colorant, a filler, a polymer latex, a coalescing agent, a cosolvent, or a combination comprising at least one of the foregoing.

Embodiment 24

The method of any one or more of Embodiments 1 to 23, wherein the additive is a coalescing agent.

Embodiment 25

The method of any one or more of Embodiments 1 to 24, wherein the concentration of organic solvent in the aqueous polymer dispersion is less than 75 parts per million (ppm), preferably less than 50 ppm, more preferably less than 25 ppm.

Embodiment 26

The method of any one or more of Embodiments 1 to 25, wherein the polyimide particles include less than 100 ppm, preferably less than 50 ppm, more preferably less than 25 ppm of surfactant.

Embodiment 27

A method of manufacturing polyimide particles, including: contacting a polyimide solution including a polyimide and an organic solvent with an aqueous solution including water in the presence of a surfactant at a shear rate from 1,000 to 3,000, preferably from 1,000 to 2,500 revolutions per minute to form an emulsion; transferring the emulsion into a receiving water at a temperature of 65° C. to 100° C. to remove the organic solvent and form an aqueous polymer dispersion, wherein the concentration of organic solvent in the aqueous polymer dispersion is less than 75 ppm, preferably less than 50 ppm, more preferably less than 25 ppm; forming a wet cake and an aqueous phase from the aqueous polymer dispersion, wherein the conductivity of the aqueous phase is less than 100 μs, preferably less than 50 μs, more preferably less than 15 μs; drying the wet cake to recover polyimide particles; wherein the polyimide particles are recovered through a centrifuge device at a rate of 5 to 40 kg/hr/m$^2$, preferably 10 to 35 kg/hr/m$^2$, more preferably 15 to 35 kg/hr/m$^2$, or through a pressure filtration device at a rate of 215 to 1500 kg/hr/m$^2$, preferably 215 to 1300 kg/hr/m$^2$, preferably 290 to 1300 kg/hr/in, more preferably from 450 to 1300 kg/hr/m$^2$ and wherein the polyimide particles have a spherical morphology and a volume based D10 diameter from 3 to 50 micrometers, preferably from 3 to 45 micrometers and a volume based D90 diameter from 3 to 80 micrometers, preferably from 3 to 75 micrometers, more preferably from 3 to 45 micrometers and a volume based D100 diameter from 3 to 100 micrometers, preferably from 3 to 75 micrometers, more preferably from 10 to 75 micrometers.

Embodiment 27A

The method of any one or more of the preceding Embodiments, wherein one or more, preferably all, of the following conditions apply: the organic solvent is methylene chloride; the aqueous polymer dispersion comprises from 0.01 to 5 weight percent, preferably from 0.01 to 2 weight percent, more preferably from 0.01 to 1 weight percent of the emulsifying surfactant, wherein the weight percent is based on the total weight of the aqueous polymer dispersion; the emulsifying surfactant is an anionic surfactant, preferably sodium dodecyl benzene sulfonate, sodium lauryl sulfate, or a combination comprising at least one of the foregoing; the bulk density of the dry particles is greater than or equal to 0.5 grams/cm$^3$, preferably greater than or equal to 0.6 grams/cm); or wherein the polyimide is a polyetherimide, a poly(etherimide-siloxane), a poly(etherimide-sulfone), or a combination comprising at least one of the foregoing, preferably a polyetherimide comprising units derived from the reaction of bisphenol A dianhydride and m-phenylene diamine.

Embodiment 28

Polyimide particles made by the method of any one or more of Embodiments 1 to 27 or 27A.

Embodiment 29

Polyimide or polyetherimide particles including a spherical morphology and a volume based D10 diameter from 3 to 50 micrometers, preferably from 3 to 45 micrometers and a volume based D90 diameter from 3 to 80 micrometers, preferably from 3 to 75 micrometers, more preferably from 3 to 45 micrometers and a surfactant concentration less than 100 ppm, preferably less than 50 ppm, more preferably less than 25 ppm.

Embodiment 30

The method of Embodiment 29, wherein the particles include a volume based D100 diameter from 3 to 100 micrometers, preferably from 3 to 75 micrometers, more preferably from 10 to 75 micrometers.

Embodiment 31

An article including the polyimide particles formed by the method of any one or more of Embodiments 1 to 27 or 27A.

Embodiment 32

The article of Embodiment 31, wherein the article is a cookware coating tie layer, an epoxy toughening coating, a composite unidirectional tape, an adhesive, a tie layer to bond metal and a fluoropolymer, or a coating.

Embodiment 33

The article of Embodiment 32, wherein the polyimide particles form a coating disposed on an injection molded article, an extruded article, an electrical conductor, an optical article, a wood article, a glass article, a carbon article, a plastic article, a ceramic fiber, a carbon fiber, a glass fiber, a boron fiber, a silicon fiber, an aluminum fiber, a zirconium fiber, or a combination comprising at least one of the foregoing.

Embodiment 34

A method of manufacturing polyimide particles, comprising: combining a polyimide solution comprising a polyimide and an organic solvent with an aqueous solution comprising water in the presence of an emulsifying surfactant at a shear rate from 1,000 to 3,000 revolutions per minute, preferably from 1,000 to 2,500 revolutions per minute, more preferably from 1,500 to less than 2,500 revolutions per minute to form an emulsion; removing the organic solvent from the emulsion to form an aqueous polymer dispersion comprising polyimide particles; and recovering the polyimide particles from the aqueous polymer dispersion, wherein the polyimide particles have a spherical morphology, and a volume based D10 diameter from 3 to 50 micrometers, preferably from 3 to 45 micrometers and a volume based D90 diameter from 3 to 80 micrometers, preferably from 3 to 75 micrometers, more preferably from 3 to 45 micrometers and a volume based D100 diameter from 3 to 100 micrometers, preferably from 3 to 75 micrometers, more preferably from 10 to 75 micrometers; and, optionally, wherein the aqueous polymer dispersion further comprises an additive composition comprising a stabilizer, a colorant, a filler, a polymer latex, a coalescing agent, a cosolvent, a surfactant different from the emulsifying surfactant, or a combination comprising at least one of the foregoing, each in an amount from 0.1 to 10 total weight percent, preferably wherein the additive is a coalescing agent.

Embodiment 35

The method of Embodiment 34, wherein removing the organic solvent comprises: heating the emulsion to a temperature effective to vaporize the organic solvent, preferably by heating the emulsion to a temperature of 70° C. to 100° C.; or combining the emulsion with water under conditions effective to form the aqueous polymer dispersion, preferably including one or more of contacting the emulsion with a receiving water, preferably wherein the receiving water is at a temperature of 65° C. to 100° C., or comprising forming drops comprising the emulsion before contacting the emulsion with the receiving water.

Embodiment 36

The method of any one or more of the preceding Embodiments, wherein recovering comprises forming a wet cake comprising the polyimide particles and an aqueous phase, preferably wherein the aqueous phase has a conductivity from 0.01 to 100 microsiemens, preferably from 0.10 to 50 microsiemens, more preferably from 0.01 to 15 microsiemens; preferably wherein form the wet cake comprises (a) filtering the aqueous dispersion, preferably under pressure, to form the wet cake and the aqueous phase, or (b) centrifuging the aqueous dispersion to form the wet cake and the aqueous phase.

Embodiment 37

The method of any one or more of the preceding Embodiments, wherein the polyimide particles are recovered through a centrifuge device at a rate of 5 to 40 kg/hr/m$^2$, preferably 10 to 35 kg/hr/m$^2$, more preferably 15 to 35 kg/hr/m$^2$, or wherein the polyimide particles are recovered through a pressure filtration device at the rate of 215 to 1500 kg/hr/m$^2$, preferably 215 to 1300 kg/hr/m$^2$, preferably 290 to 1300 kg/hr/m$^2$, more preferably from 450 to 1300 kg/hr/m$^2$.

Embodiment 37

The method of any one or more of the preceding Embodiments, further comprising drying the recovered polyimide particles, preferably wherein the bulk density of the dry particles is greater than or equal to 0.5 grams/cm$^3$, preferably greater than or equal to 0.6 grams/cm$^3$.

Embodiment 38

The method of any one or more of the preceding Embodiments, wherein one or more, preferably all, of the following conditions apply: the concentration of the polyimide in the polyimide solution is from 0.5 to 35 weight percent, preferably from 1 to 25 weight percent, more preferably from 10 to 20 weight percent; the ratio of aqueous solution to polyimide solution in the emulsion is from 3:1 to 0.5:1 (wt %:wt %); the organic solvent methylene chloride or chloroform; the aqueous polymer dispersion comprises from 0.01 to 5 weight percent, preferably from 0.01 to 2 weight percent, more preferably from 0.01 to 1 weight percent of the emulsifying surfactant, wherein the weight percent is based on the total weight of the aqueous polymer dispersion; the emulsifying surfactant is an anionic surfactant, preferably sodium dodecyl benzene sulfonate, sodium lauryl sulfate, or a combination comprising at least one of the foregoing; wherein the polyimide is a polyetherimide, a polyetherimide copolymer, a poly(etherimide-siloxane), a poly(etherimide-sulfone), or a combination comprising at least one of the foregoing, preferably a polyetherimide comprising units derived from the reaction of bisphenol A dianhydride and m-phenylene diamine; the concentration of organic solvent in the aqueous polymer dispersion is less than 75 parts per million (ppm), preferably less than 50 ppm, more preferably less than 25 ppm; the polyimide particles comprise less than 100 ppm, preferably less than 50 ppm, more preferably less than 25 ppm of surfactant.

Embodiment 39

A method of manufacturing polyimide particles, comprising: contacting a polyimide solution comprising a polyimide and an organic solvent with an aqueous solution comprising water in the presence of a surfactant at a shear rate from 1,000 to 3,000, preferably from 1,000 to 2,500 revolutions per minute to form an emulsion; transferring the emulsion into a receiving water at a temperature of 65° C. to 100° C. to remove the organic solvent and form an aqueous polymer dispersion, wherein the concentration of organic solvent in the aqueous polymer dispersion is less than 75 ppm, preferably less than 50 ppm, more preferably less than 25 ppm; forming a wet cake and an aqueous phase from the aqueous polymer dispersion, wherein the conductivity of the aqueous phase is less than 100 microsiemens, preferably less than 50 microsiemens, more preferably less than 15 microsiemens; and optionally, drying the wet cake to recover polyimide particles; wherein the polyimide particles are recovered through a centrifuge device at a rate of 5 to 40 kilograms/hour/meter squared (kg/hr/m$^2$), preferably 10 to 35 kg/hr/m$^2$, more preferably 15 to 35 kg/hr/m$^2$, or wherein the polyimide particles are recovered through a pressure filtration device at the rate of 215 to 1500 kg/hr/m$^2$, preferably 215 to 1300 kg/hr/m$^2$, preferably 290 to 1300 kg/hr/m$^2$, more preferably from 450 to 1300 kg/hr/m$^2$, and wherein the polyimide particles have a spherical morphology and a volume based D10 diameter from 3 to 50 micrometers, preferably from 3 to 45 micrometers and a volume based D90 diameter from 3 to 80 micrometers, preferably from 3 to 75 micrometers, more preferably from 3 to 45 micrometers and a volume based D100 diameter from 3 to 100 micrometers, preferably from 3 to 75 micrometers, more preferably from 10 to 75 micrometers.

Embodiment 40

Polyimide particles made by the method of any one or more of the preceding Embodiments.

Embodiment 41

Polyimide particles comprising a spherical morphology, a volume based D10 diameter from 3 to 50 micrometers, preferably from 3 to 45 micrometers, a volume based D90 diameter from 3 to 80 micrometers, preferably from 3 to 75 micrometers, more preferably from 3 to 45 micrometers, and a surfactant concentration of less than 100 ppm, preferably less than 50 ppm, more preferably less than 25 ppm; and preferably wherein the particles comprise a volume based D100 diameter from 3 to 100 micrometers, preferably from 3 to 75 micrometers, more preferably from 10 to 75 micrometers.

Embodiment 42

An article comprising the polyimide particles formed by the method of any one or more of Embodiments 1 to 8, or the polyimide particles of claim 9, preferably wherein the article is a cookware coating tie layer, an epoxy toughening coating, a composite unidirectional tape, an adhesive, a tie layer to bond metal and a fluoropolymer, or a coating, for example wherein the polyimide particles form a coating disposed on an injection molded article, an extruded article, an electrical conductor, an optical article, a wood article, a glass article, a carbon article, a plastic article, a ceramic fiber, a carbon fiber, a glass fiber, a boron fiber, a silicon fiber, an aluminum fiber, a zirconium fiber, or a combination comprising at least one of the foregoing.

In general, the compositions or methods may alternatively comprise, consist of, or consist essentially of, any appropriate components or steps herein disclosed. The invention may additionally, or alternatively, be formulated so as to be devoid, or substantially free, of any components, materials, ingredients, adjuvants, or species, or steps used in the prior art compositions or that are otherwise not necessary to the achievement of the function and/or objectives of the present claims.

The terms "a" and "an" do not denote a limitation of quantity, but rather denote the presence of at least one of the referenced item. The term "or" means "and/or" unless clearly indicated otherwise by context. Reference throughout the specification to "one embodiment," "another embodiment", "an embodiment," and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

"Optional" or "optionally" means that the subsequently described event or circumstance may or may not occur, and that the description includes instances where the event occurs and instances where it does not. Unless specified to the contrary, all test standards are the most recent standard in effect at the time of filing this application. The endpoints of all ranges directed to the same component or property are inclusive of the endpoints, are independently combinable, and include all intermediate points and ranges (e.g., ranges of "up to about 25 wt %, or, more specifically, about 5 wt % to about 20 wt %," is inclusive of the endpoints and all intermediate values of the ranges of "about 5 wt % to about 25 wt %," such as about 10 wt % to about 23 wt %, etc.).

The terms "first," "second," and the like, "primary," "secondary," and the like, as used herein do not denote any order, quantity, or importance, but rather are used to distinguish one element from another. The term "combination" is inclusive of blends, mixtures, alloys, reaction products, and the like. Unless defined otherwise, technical and scientific terms used herein have the same meaning as is commonly understood by one of skill in the art to which this invention belongs.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. As used herein, the term "hydrocarbyl" includes groups containing carbon, hydrogen, and optionally one or more heteroatoms (e.g., 1, 2, 3, or 4 atoms such as halogen, O, N, S, P, or Si). "Alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene (—$CH_2$—) or propylene (—$(CH_2)_3$—)). "Alkenyl" and "alkenylene" mean a monovalent or divalent, respectively, straight or branched chain hydrocarbon group having at least one carbon-carbon double bond (e.g., ethenyl (—HC═$CH_2$) or propenylene (—HC($CH_3$)═$CH_2$—). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, of the formula —$C_nH_{2n-x}$ and —$C_nH_{2n-2x}$— wherein x is the number of cyclization(s). "Aryl" means a monovalent, monocyclic, or polycyclic aromatic group (e.g., phenyl or naphthyl). "Arylene" means a divalent, monocyclic, or polycyclic aromatic group (e.g., phenylene or naphthylene). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3 heteroatoms, wherein each heteroatom is independently N, O, S, or P.

"Substituted" means that the compound or group is substituted with at least one (e.g., 1, 2, 3, or 4) substituents instead of hydrogen, where each substituent is independently nitro (—$NO_2$), cyano (—CN), hydroxy (—OH), halogen, thiol (—SH), thiocyano (—SCN), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_{5-18}$ cycloalkenyl, $C_{6-12}$ aryl $C_{7-13}$ arylalkylene (e.g., benzyl), $C_{7-12}$ alkylarylene (e.g., toluyl), $C_{4-12}$ heterocycloalkyl, $C_{3-12}$ heteroaryl, $C_{1-6}$ alkyl sulfonyl (—S(═O)$_2$-alkyl), $C_{6-12}$ arylsulfonyl (—S(═O)$_2$-aryl), or tosyl ($CH_3C_6H_4SO_2$—), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the group, including those of the substituent(s).

While the invention has been described with reference to an exemplary embodiment, it will be understood by those skilled in the art that various changes may be made and equivalents may be substituted for elements thereof without departing from the scope. In addition, many modifications may be made to adapt a particular situation or material to the teachings of the invention without departing from the essential scope thereof. Therefore, it is intended that the invention not be limited to ant particular embodiment, but that the invention includes all embodiments falling within the scope of the appended claims.

What is claimed is:
1. A method of manufacturing polyimide particles, comprising:
  combining a polyimide solution comprising a polyimide and an organic solvent with an aqueous solution comprising water in the presence of an emulsifying surfactant using high shear agitation at a rotational speed from 1,500 to less than 2,500 revolutions per minute to form an emulsion;

removing the organic solvent from the emulsion to form an aqueous polymer dispersion comprising polyimide particles; and recovering the polyimide particles from the aqueous polymer dispersion, wherein the polyimide particles have a spherical morphology, and a volume based D10 diameter from 3 to 50 micrometers, and a volume based D90 diameter from 3 to 80 micrometers, and a volume based D100 diameter from 3 to 100 micrometers.

2. The method of claim 1, wherein the aqueous polymer dispersion further comprises an additive composition comprising a stabilizer, a colorant, a filler, a polymer latex, a coalescing agent, a cosolvent, a surfactant different from the emulsifying surfactant, or a combination comprising at least one of the foregoing, each in an amount from 0.1 to 10 total weight percent.

3. The method of claim 1, wherein removing the organic solvent comprises heating the emulsion to a temperature effective to vaporize the organic solvent, preferably by heating the emulsion to a temperature of 70° C. to 100° C.; or combining the emulsion with water under conditions effective to form the aqueous polymer dispersion, preferably including one or more of contacting the emulsion with a receiving water, preferably wherein the receiving water is at a temperature of 65° C. to 100° C., or comprising forming drops comprising the emulsion before contacting the emulsion with the receiving water.

4. The method of claim 1, wherein recovering comprises forming a wet cake comprising the polyimide particles and an aqueous phase;

wherein forming the wet cake comprises (a) filtering the aqueous dispersion, preferably under pressure, to form the wet cake and the aqueous phase, or (b) centrifuging the aqueous dispersion to form the wet cake and the aqueous phase.

5. The method of claim 4, wherein the recovering further comprises washing the wet cake with an aqueous wash to provide a second aqueous phase.

6. The method of claim 5, wherein washing comprises filtering the aqueous wash through the wet cake; or washing comprises contacting the wet cake with the aqueous wash to form a slurry, and recovering the polyimide particles from the slurry.

7. The method of claim 1, wherein the polyimide particles are recovered through a centrifuge device at a rate of 5 to 40 kg/hr/m², or wherein the polyimide particles are recovered through a pressure filtration device at the rate of 215 to 1500 kg/hr/m².

8. The method of claim 1, further comprising drying the recovered polyimide particles.

9. The method of claim 1, wherein one or more of the following conditions apply:

the concentration of the polyimide in the polyimide solution is from 0.5 to 35 weight percent;

the ratio of aqueous solution to polyimide solution in the emulsion is from 3:1 to 0.5:1 (wt %:wt %);

the organic solvent methylene chloride or chloroform;

the aqueous polymer dispersion comprises from 0.01 to 5 weight percent of the emulsifying surfactant, wherein the weight percent is based on the total weight of the aqueous polymer dispersion;

the emulsifying surfactant is an anionic surfactant, preferably sodium dodecyl benzene sulfonate, sodium lauryl sulfate, or a combination comprising at least one of the foregoing;

wherein the polyimide is a polyetherimide, a polyetherimide copolymer, a poly(etherimide-siloxane), a poly(etherimide-sulfone), or a combination comprising at least one of the foregoing;

the concentration of organic solvent in the aqueous polymer dispersion is less than 75 parts per million (ppm);

the polyimide particles comprise less than 100 ppm of surfactant.

10. A method of manufacturing polyimide particles, comprising:

contacting a polyimide solution comprising a polyimide and an organic solvent with an aqueous solution comprising water in the presence of a surfactant using high shear agitation at a rotational speed from 1,500 to less than 2,500 revolutions per minute to form an emulsion;

transferring the emulsion into a receiving water at a temperature of 65° C. to 100° C. to remove the organic solvent and form an aqueous polymer dispersion, wherein the concentration of organic solvent in the aqueous polymer dispersion is less than 75 ppm;

forming a wet cake and an aqueous phase from the aqueous polymer dispersion, wherein the conductivity of the aqueous phase is less than 100 microsiemens; and optionally, drying the wet cake to recover polyimide particles;

wherein the polyimide particles are recovered through a centrifuge device at a rate of 5 to 40 kilograms/hour/meter squared (kg/hr/m²), or wherein the polyimide particles are recovered through a pressure filtration device at the rate of 215 to 1500 kg/hr/m², and wherein the polyimide particles have a spherical morphology and a volume based D10 diameter from 3 to 50 micrometers, and a volume based D90 diameter from 3 to 80 micrometers, and a volume based D100 diameter from 3 to 100 micrometers.

11. Polyimide particles made by the method of claim 1.

12. Polyimide particles comprising a spherical morphology, a volume based D10 diameter from 3 to 50 micrometers, a volume based D90 diameter from 3 to 80 micrometers, a surfactant concentration of less than 100 ppm, and wherein the particles comprise a volume based D100 diameter from 3 to 100 micrometers.

13. An article formed from the polyimide particles of claim 11 and having a surfactant concentration of less than 100 ppm.

* * * * *